United States Patent [19]
Saxena et al.

[11] Patent Number: 5,609,550
[45] Date of Patent: Mar. 11, 1997

[54] METHOD FOR DIAGNOSING A TORQUE CONVERTER'S LOCK-UP MECHANISM

[75] Inventors: Rajiv Saxena, Livonia; John R. Boldt, Troy; Samuel Campbell, III, Southfield; Himshweta R. Amin, Novi; William O. Robinson, Detroit, all of Mich.

[73] Assignee: Chrysler Corporation, Auburn Hills, Mich.

[21] Appl. No.: 425,012

[22] Filed: Apr. 17, 1995

[51] Int. Cl.⁶ ................................................. B60K 41/02
[52] U.S. Cl. ........................... 477/166; 477/175; 477/906
[58] Field of Search ................................... 477/166, 168, 477/169, 175, 906

[56] References Cited

U.S. PATENT DOCUMENTS

| | | | |
|---|---|---|---|
| 4,510,747 | 4/1985 | Yoshida | 477/169 X |
| 5,103,692 | 4/1992 | Shimanaka et al. | 477/906 X |
| 5,129,287 | 7/1992 | Asada et al. | 477/906 X |
| 5,148,722 | 9/1992 | Mehta | 477/906 X |
| 5,191,814 | 5/1993 | Ando et al. | 477/906 X |
| 5,209,141 | 5/1993 | Asayama et al. | 477/906 X |
| 5,366,424 | 11/1994 | Wataya | 477/906 X |
| 5,416,665 | 5/1995 | Nishiwaki et al. | 477/175 X |
| 5,489,012 | 2/1996 | Buckley et al. | 477/175 X |
| 5,527,238 | 6/1996 | Hrovat et al. | 477/166 |

*Primary Examiner*—Charles A. Marmor
*Assistant Examiner*—Peter Kwon
*Attorney, Agent, or Firm*—Mark P. Calcaterra

[57] ABSTRACT

A method of diagnosing a lock-up mechanism for a torque converter in an automatic transmission of an automotive vehicle includes the steps of sensing vehicle speed and engine speed, calculating a vehicle speed to engine speed ratio based on the sensed vehicle speed and engine speed, knowing when the torque converter transitions between unlock and lock are initiated, determining whether the calculated ratio is greater than a predetermined threshold when the torque converter transitions between unlock and lock, and concluding that a failure of the lock-up mechanism has occurred if the calculated ratio is not greater than the predetermined threshold within a predetermined time since transition of the torque converter.

16 Claims, 7 Drawing Sheets

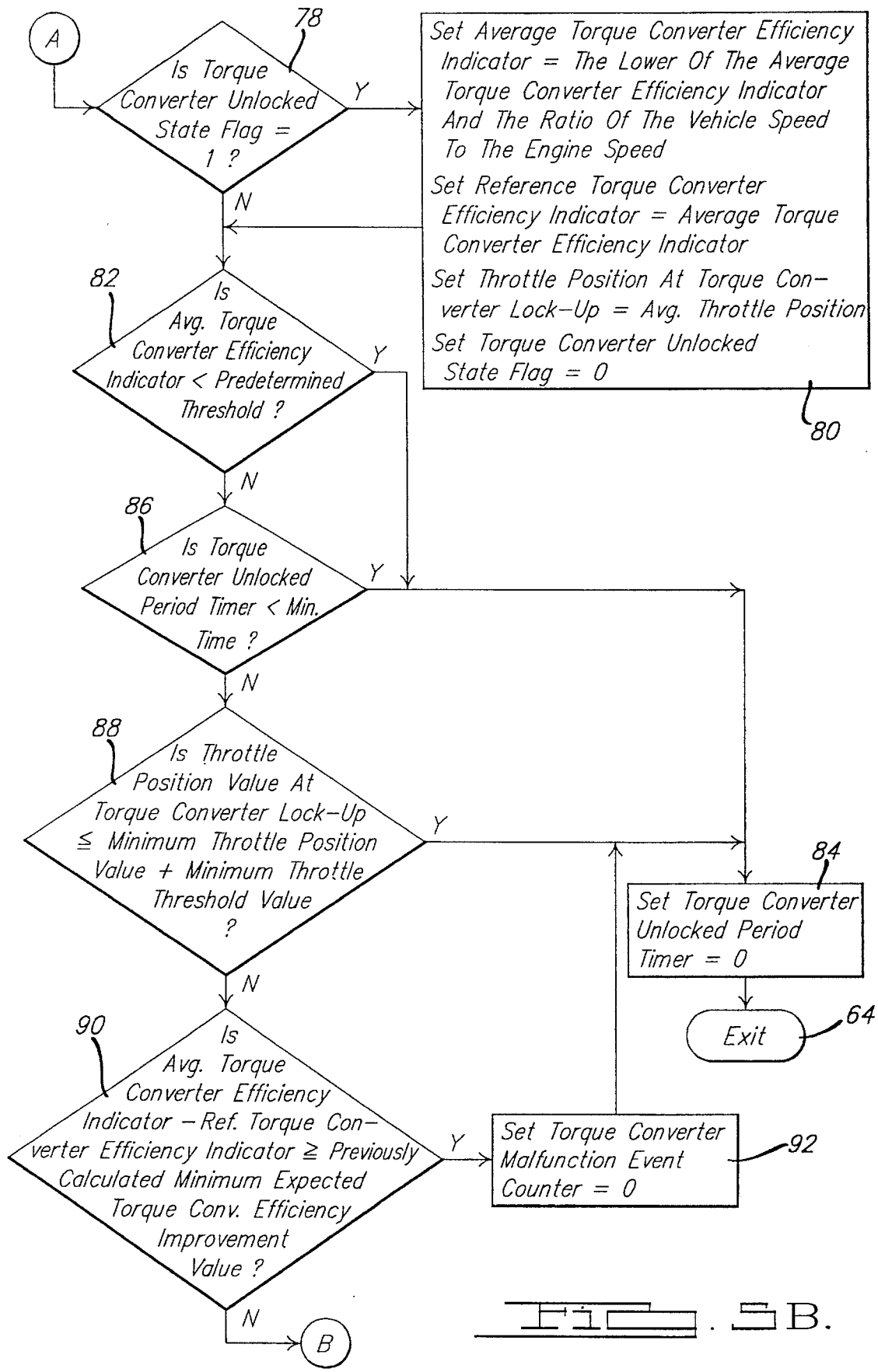

METHOD FOR DIAGNOSING A TORQUE CONVERTER'S LOCK-UP MECHANISM

BACKGROUND OF THE INVENTION

1. Field of the Invention

The present invention relates generally to torque converters for automatic transmissions and, more particularly, to a method for diagnosing a lock-up mechanism for a torque converter in an automatic transmission of an automotive vehicle.

2. Description of the Related Art

Torque converters are used in automatic transmissions for automotive vehicles to transfer power from a prime mover such as an engine of the automotive vehicle to a change speed gear box of the transmission from where it is transmitted to a drive unit such as a final wheel drive of the vehicle. These torque converters typically include a lock-up clutch or mechanism to mechanically interconnect an impeller and turbine of the torque converter during certain operating conditions.

An example of a lock-up mechanism for a torque converter in an automatic transmission is disclosed in U.S. Pat. No. 4,289,048 to Mikel et al. Although this lock-up mechanism has worked well, there is no provision for detecting a malfunction of the torque converter based on proper unlock and lock of the lock-up mechanism. Therefore, there is a need in the art to provide a method for diagnosing a torque converter's lock-up mechanism for detecting a malfunction of the torque converter.

SUMMARY OF THE INVENTION

It is, therefore, one object of the present invention to provide a method for diagnosing a lock-up mechanism for a torque converter in an automatic transmission of an automotive vehicle.

It is another object of the present invention to provide a method for detecting a malfunctioning torque converter in an automatic transmission based on proper lock and unlock of a lock-up mechanism for the torque converter.

To achieve the foregoing objects, the present invention is a method for diagnosing a lock-up mechanism for a torque converter in an automatic transmission of an automotive vehicle. The method includes the steps of sensing vehicle speed and engine speed, calculating a vehicle speed to engine speed ratio based on the sensed vehicle speed and engine speed, knowing when the torque converter transitions between unlock and lock are initiated, determining whether the calculated ratio is greater than a predetermined threshold when the torque converter transitions between unlock and lock, and concluding that a failure of the lock-up mechanism has occurred if the calculated ratio is not greater than the predetermined threshold within a predetermined time since transition of the torque converter.

One advantage of the present invention is that a method is provided for diagnosing a lock-up mechanism for a torque converter in an automatic transmission of an automotive vehicle. Another advantage of the present invention is that the method detects a malfunctioning torque converter based on proper unlock and lock of the lock-up mechanism.

Other objects, features and advantages of the present invention will be readily appreciated as the same becomes better understood after reading the subsequent description taken in conjunction with the accompanying drawings.

BRIEF DESCRIPTION OF THE DRAWINGS

FIGS. 5A through 5C are flowcharts of a method for diagnosing a lock-up mechanism, according to the present invention, of the torque converter in the automotive vehicle of FIG. 1.

DESCRIPTION OF THE PREFERRED EMBODIMENT(S)

Figure 1:
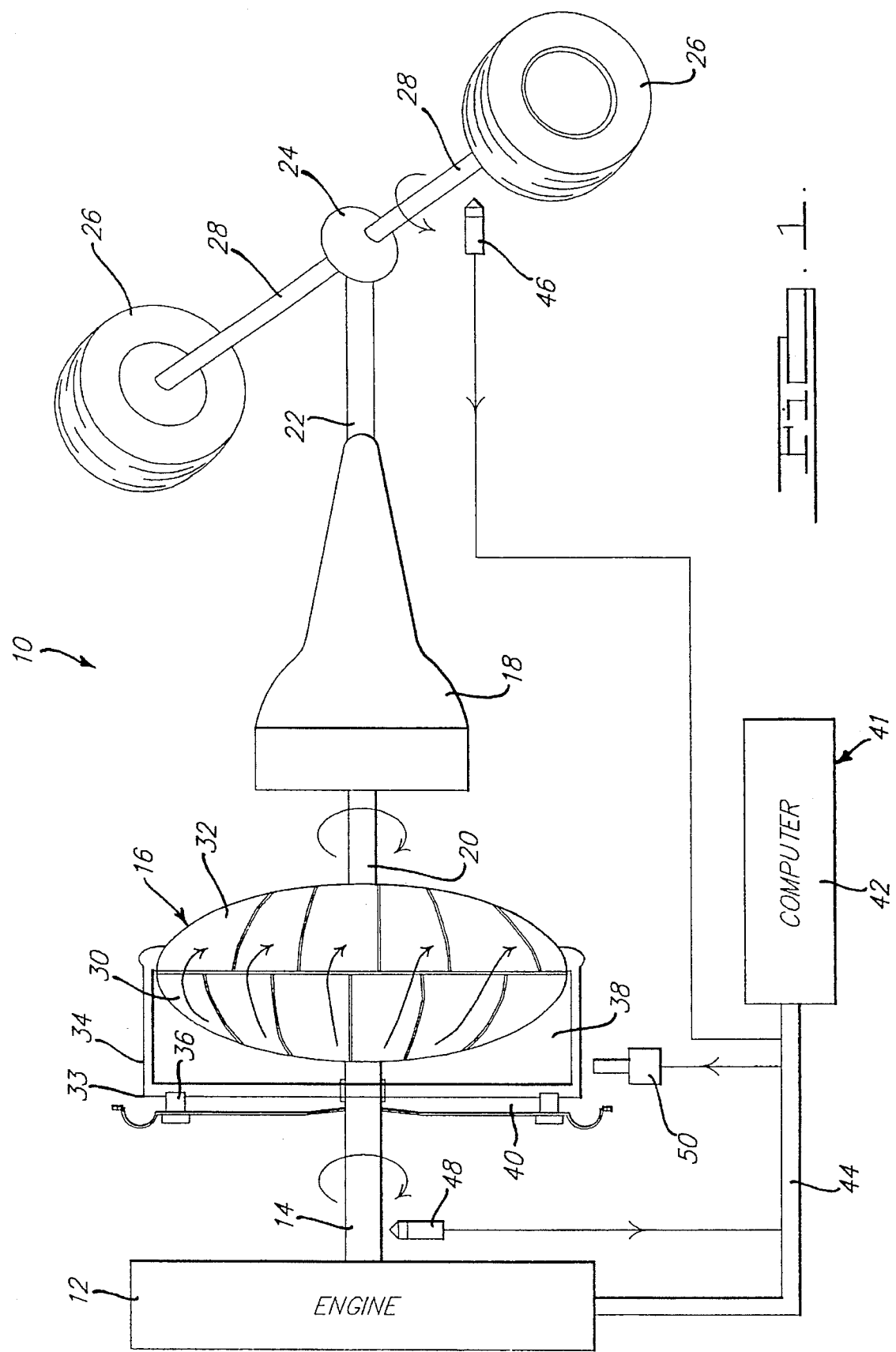
FIG. 1 is a system diagram of an automotive vehicle utilizing a method for diagnosing a lock-up mechanism of a torque converter, according to the present invention.

Referring to FIG. 1, a system diagram of a vehicle 10 such as an automotive vehicle is shown. The vehicle 10 includes an engine 12 having a rotatable crankshaft 14, and a torque converter, generally indicated at 16, connected to the crankshaft 14. The vehicle 10 also includes a transmission 18 such as an automatic transmission having a rotatable input shaft 20 connected to the torque converter 16 and a rotatable output shaft 22. The vehicle 10 further includes a differential 24 connected to the output shaft 22 and rotatable wheels 26 connected by rotatable axles 28 to the differential 24. It should be appreciated that power is delivered to the wheels 26 from the engine 12 via crankshaft 14, torque converter 16, input shaft 20, transmission 18, output shaft 22, differential 24 and axles 28.

The torque converter 16 includes a rotatable impeller 30 connected to the crankshaft 14 and a rotatable turbine 32 connected to the input shaft 20. The torque converter 16 also includes a lock-up mechanism, generally indicated at 33, for selectively locking or connecting the impeller 30 and turbine 32 together during certain operating conditions. The lock-up mechanism 33 includes a lock-up piston 34 connected to the turbine 32 and a friction disc 36 connected to the crankshaft 14. The torque converter 16 further includes a lock-up apply chamber 38 and a lock-up release chamber 40 for actuating the lock-up piston 34 in response to the pressure or absence of fluid therein. It should be appreciated that the torque converter 16 is conventional and known in the art.

The vehicle 10 also includes a control system, generally indicated at 41, for controlling the engine 12 and lock-up mechanism 33. The control system 41 includes a computer 42 connected via a wiring harness 44 to the engine 12. The control system 41 also includes a vehicle speed sensor 46 located near the axles 28 for sensing the speed of the vehicle 10 and an engine speed sensor 48 located near the crankshaft 14 to sense the speed of the engine 12. The control system 41 further includes a lock-up solenoid-actuated valve 50 for controlling fluid flow to the lock-up apply chamber 38 and from the lock-up release chamber 40. The lock-up solenoid-actuated valve 50 is used to initiate transitions between lock and unlock of the torque converter 16 as subsequently described. The sensors 46,48 and solenoid-actuated valve 50 are connected via the wiring harness 44 to the computer 42. It should be appreciated that the computer 42 uses the engine speed sensor 48, vehicle speed sensor 46 and the desired state of the lock-up solenoid-actuated valve. 50 to diagnose torque converter functionality. It should also be appreciated that the solenoid-actuated valve 50 can either be in an energized or a de-energized state depending upon whether the computer 42 wants to lock or unlock the torque converter 16.

In an unlock mode, the crankshaft 14 of the engine 12 drives the impeller 30 of the torque converter 16. The impeller 30, through fluid-coupling, drives the turbine 32 of the torque converter 16. The turbine 32, in turn, drives the input shaft 20 of the transmission 18. It should be appreciated that the fluid coupling delivers engine power to the transmission 18 smoothly. It should also be appreciated that there are frictional losses associated with the fluid coupling which may raise exhaust emission and transmission oil temperature, and lower fuel economy.

In a lock mode, the turbine 32 is directly connected to the crankshaft 14 via the lock-up piston 34 and friction disc 36. Since there is no fluid coupling in this mode, there are no frictional losses. Hence, in the lock mode, the speed of the input shaft 20 is equal to that of the crankshaft 14. The lock-up solenoid-actuated valve 50 creates a fluid pressure potential between the lock-up apply chamber 38 and lock-up release chamber 40 which forces the lock-up piston 34 to connect to the friction disc 36. It should be appreciated that the friction disc 36 is mechanically connected to crankshaft 14 and the lock-up piston 34 is mechanically connected to the turbine 32.

Figure 2:
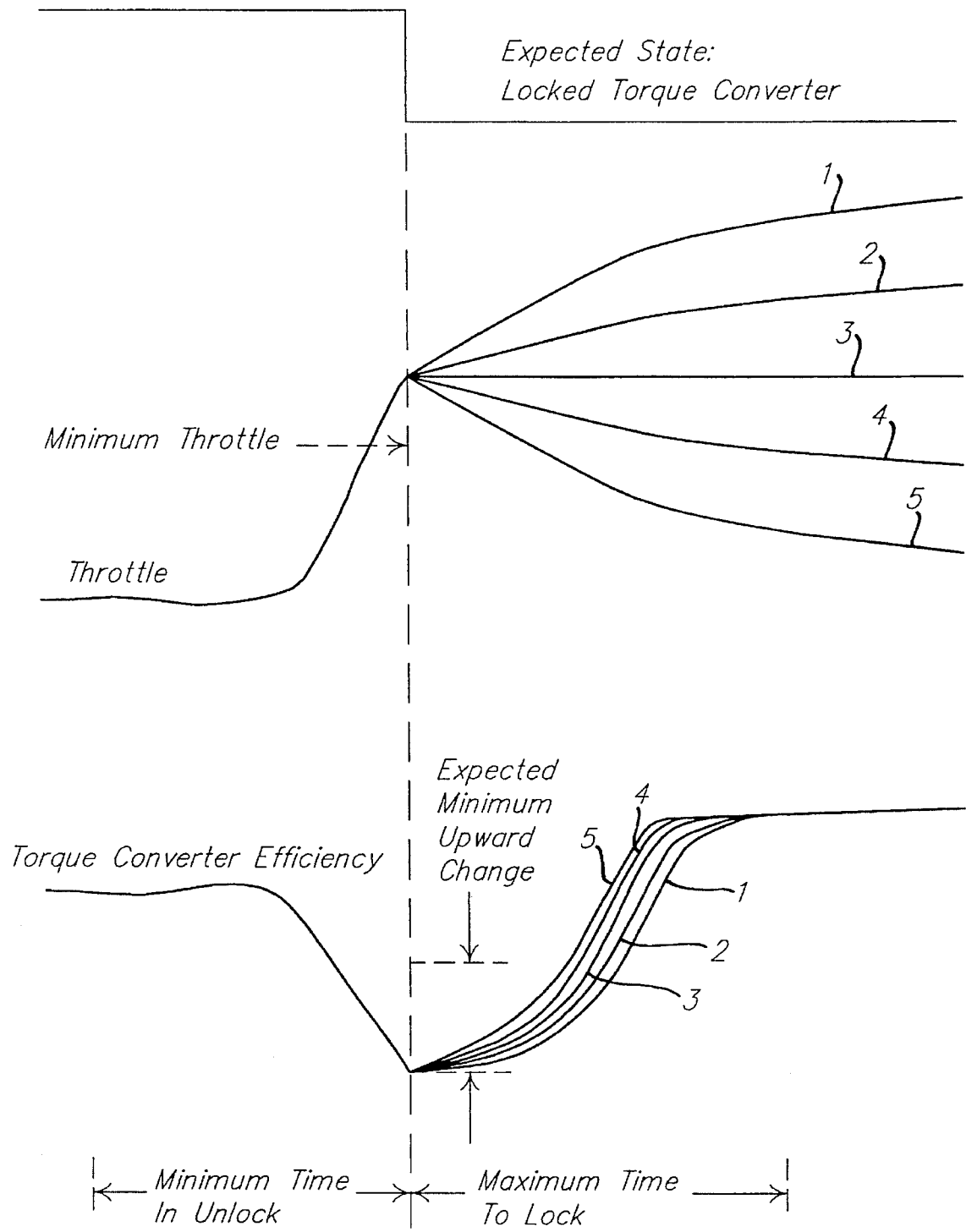
FIG. 2 is a graph of proper operation of a torque converter in the automotive vehicle of FIG. 1.

Referring to FIG. 2, a graph of proper operation of the torque converter 16 is shown. Based on the engine's 12 throttle position and the vehicle's 10 speed, the lock and unlock states of the torque converter 16, and transitions between the lock and unlock states are initiated and maintained by the control system 41. When the engine's 12 throttle position is above a predetermined throttle value and an unlock to lock transition of the torque converter 16 is initiated by the control system 41, the vehicle speed to engine speed ratio rises. However, if the ratio does not rise by more than an "expected minimum upward change" threshold value within a predetermined "maximum time to lock" time-period value, a failure occurrence of the lock-up mechanism 33 of the torque converter 16 is recorded. It should be appreciated that the numerals 1 through 5 represent five different throttle cases for torque converter locking.

Figure 3:
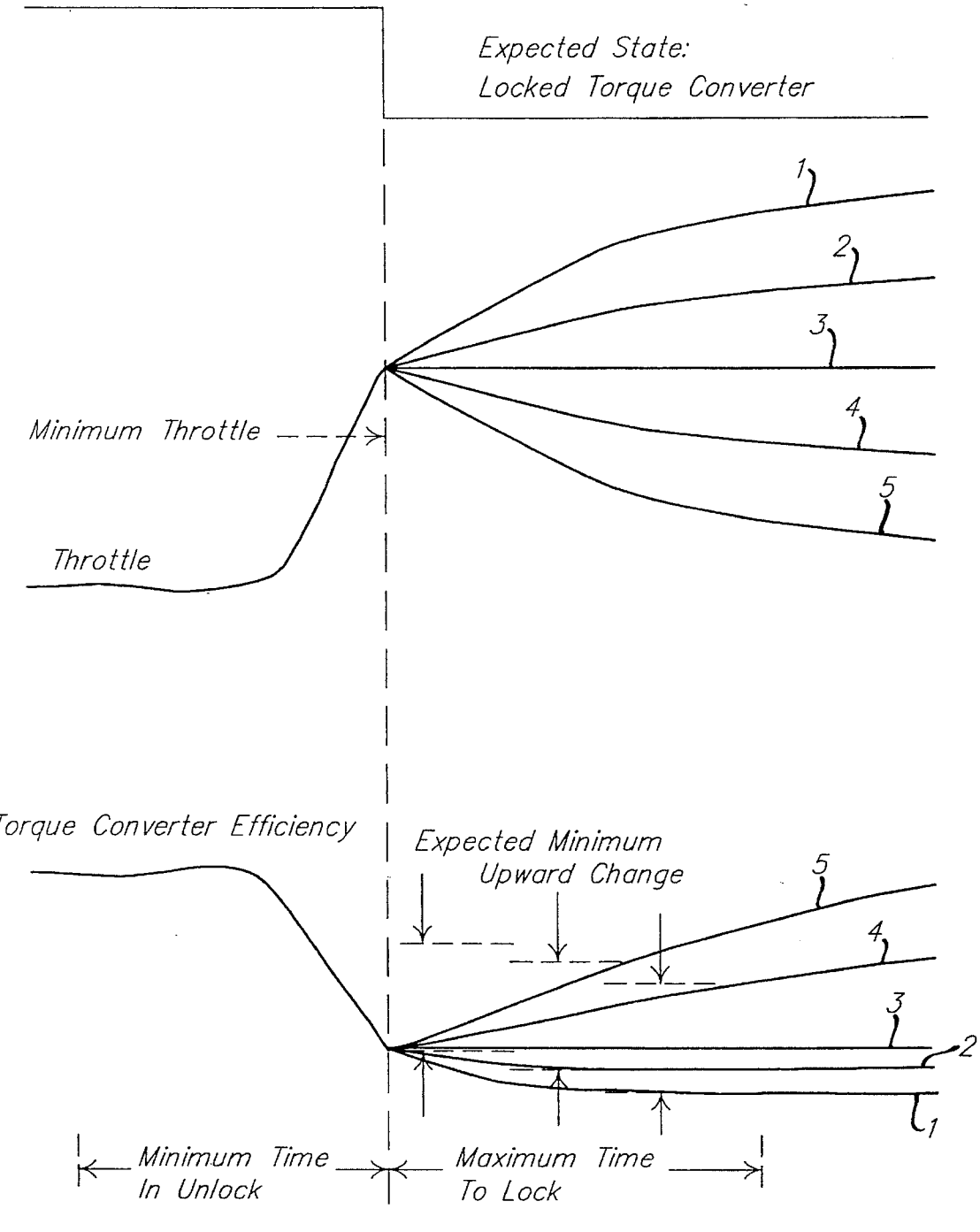
FIG. 3 is a graph of improper operation of the torque converter in the automotive vehicle of FIG. 1.
Figure 4:
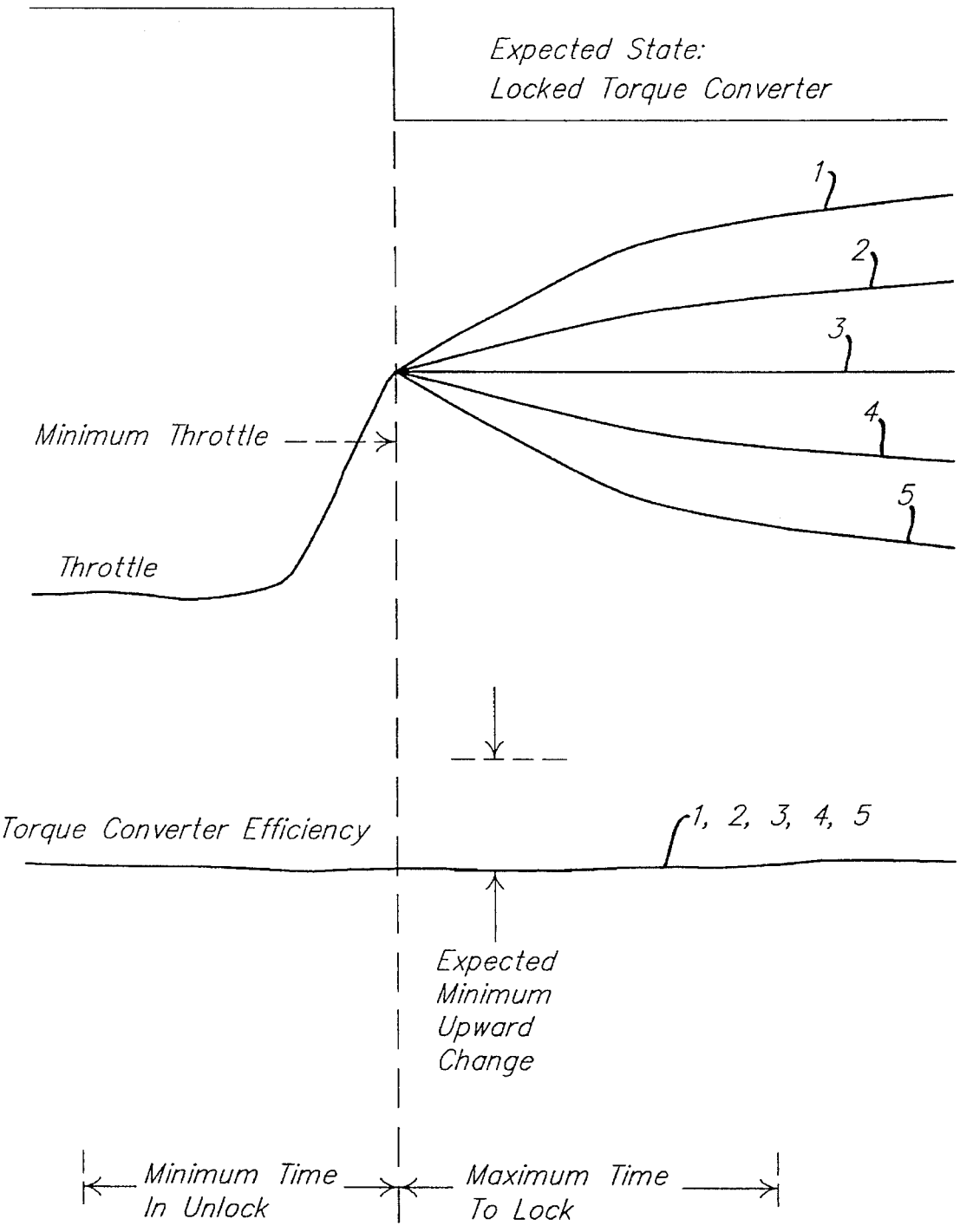
FIG. 4 is a graph of improper operation of the torque converter in the automotive vehicle of FIG. 1.

As illustrated in FIGS. 3 and 4, a graph of improper operation of the torque converter 16 is shown. The change in vehicle speed to engine speed ratio is less than the expected minimum upward change for throttle cases 1 through 4 of FIG. 3 and throttle cases 1 through 5 of FIG. 4 within the maximum time to lock. As a result, a failure occurrence of the lock-up mechanism 33 of the torque converter 16 is recorded.

Figure 5A:
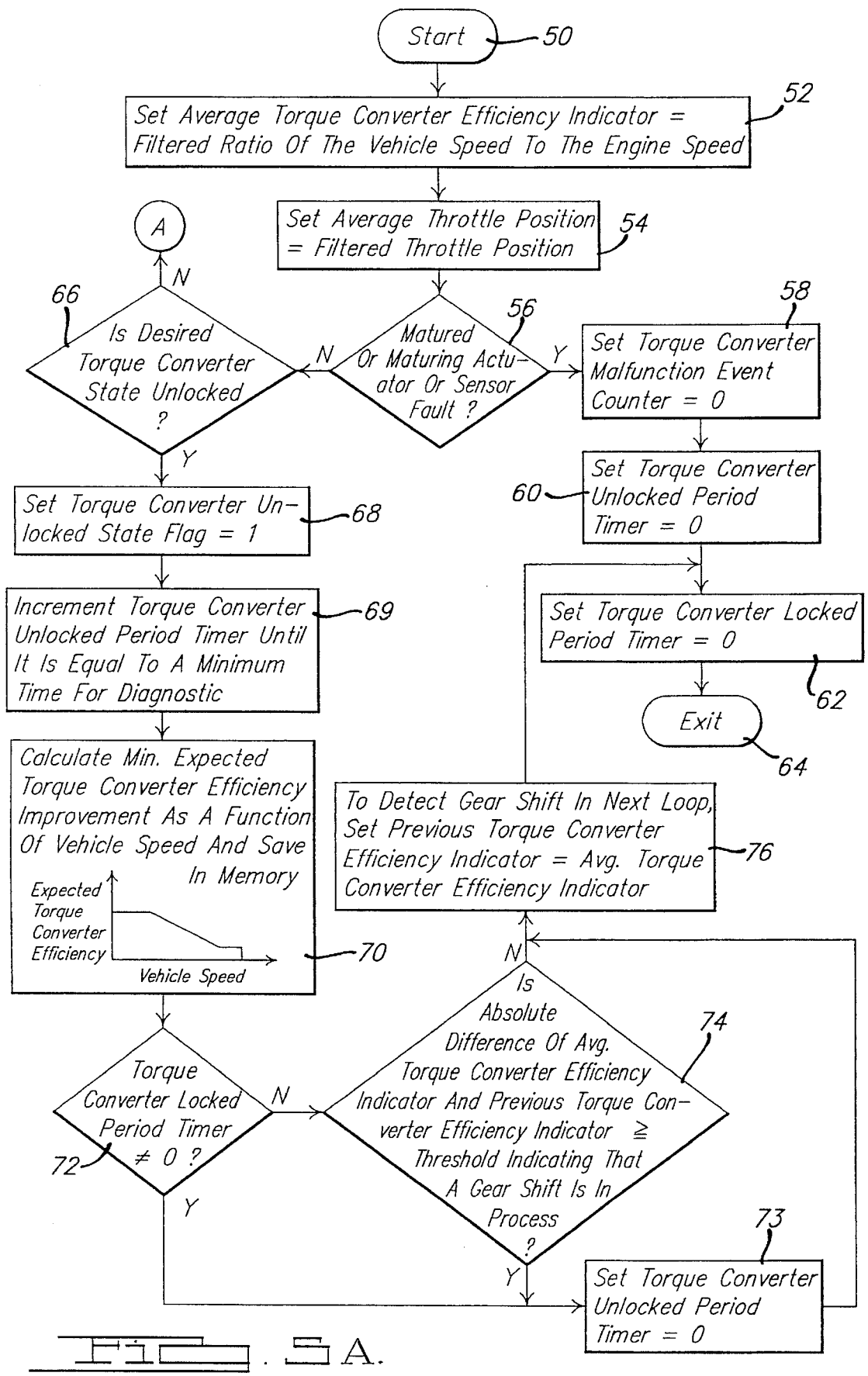
Figure 5C:
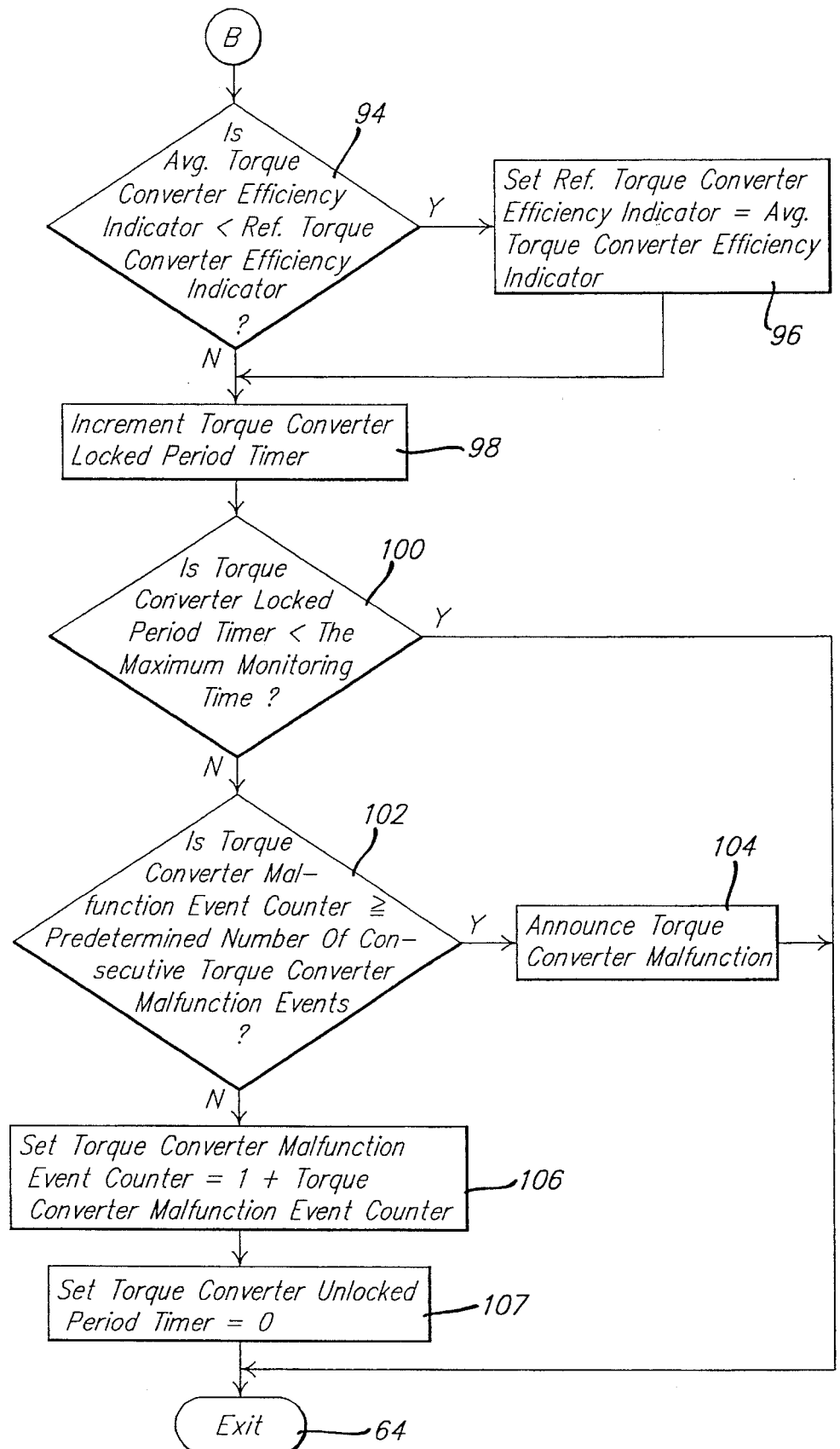

Referring to FIGS. 5A through 5C, a flowchart of a method for diagnosing the lock-up mechanism 33 of the torque converter 16 is illustrated. The method is performed when the transmission 18 is in third gear during unlock to lock transition (can be performed during lock to unlock transition by looking for a drop in torque converter efficiency greater than a predetermined threshold) of the torque converter 16 when the load on the vehicle 10 is above a predetermined threshold. It should be appreciated that the torque converter diagnostic is performed in third gear because the torque converter 16 can only be locked-up in that gear. It should also be appreciated that, if the vehicle speed to engine speed ratio is above the predetermined threshold while the torque converter 16 is locked-up, the transmission 18 is in third gear.

As illustrated in FIG. 5A, the methodology starts in bubble 50 and advances to block 52 to set an average torque converter efficiency indicator value equal to a time averaged, i.e. filtered, ratio of the vehicle speed to the engine speed values. After block 52, the methodology advances to block 54 and sets an average throttle position value equal to a filtered throttle position sensor analog-to-digital value or filtered throttle position.

After block 54, the methodology advances to diamond 56 and determines whether predetermined faults have been matured or are maturing. For example, the computer 42 looks for a lock-up solenoid fault, vehicle speed sensor fault, engine speed sensor fault or throttle position sensor fault. If a predetermined fault has matured or is maturing, the methodology disables the torque converter diagnostic by advancing to blocks 58,60,62 and bubble 64. Block 58 sets a torque converter malfunction event counter equal to a predetermined value such as zero (0). Block 60 sets a torque converter unlocked period timer equal to a predetermined value such as zero (0). The torque converter unlocked period timer is used to ensure that the torque converter 16 was unlocked long enough prior to the torque converter diagnostic. Block 62 sets a torque converter locked period timer equal to a predetermined value such as zero (0), the expected rise in torque converter efficiency must be detected before the torque converter locked period timer equals a predetermined maximum time to be described. Bubble 64 exits the routine.

In diamond 56, if there are no predetermined faults matured or are maturing, the methodology advances to diamond 66 and determines whether a desired torque converter state for the torque converter 16 is unlocked. If the desired torque converter state is unlocked, the methodology advances to block 68. In block 68, the computer 42 sets a torque converter unlocked state flag to a predetermined value such as one (1). The methodology then advances to block 69 and increments the torque converter unlocked period timer equal to the torque converter unlocked period timer plus a predetermined value such as one (1), until the torque converter unlocked period timer becomes equal to a predetermined minimum time the torque converter 16 must be unlocked to enable the torque converter diagnostic. In block 69, the methodology increments the torque converter unlocked period timer to keep track of the time spent in the unlock state. The torque converter unlocked period timer is incremented until it becomes equal to the predetermined minimum time such as five (5) seconds which is the minimum time the torque converter 16 must be unlocked, prior to locking, to enable the torque converter diagnostic. The methodology then advances to block 70 and calculates a minimum expected amount of torque converter efficiency improvement as a function of the vehicle speed, then stores the calculated value in a memory location of minimum expected improvement in torque converter efficiency for later use. The methodology then advances to diamond 72 and determines whether the torque converter locked period timer is not equal to a predetermined value such as zero (0). The methodology determines whether the torque converter 16 was locked during the last loop of the routine, this is done by determining whether the torque converter locked period timer is a non-zero value. If so, the methodology advances to block 73 and sets the torque converter unlocked period timer equal to a predetermined value such as zero (0) as previously described. If not, the methodology advances to diamond 74 and determines whether an absolute difference of the average torque converter efficiency indicator and the previous loop torque converter efficiency indicator is greater than or equal to a rate of change of the filtered ratio of the vehicle speed to the engine speed to detect a 2–3 gear shift.

The methodology determines whether the transmission 18 is shifting gear. If so, the methodology advances to block 73 previously described. If not or after block 73, the methodology advances to block 76 and sets the previous loop torque converter efficiency indicator equal to the average torque converter efficiency indicator to save the torque converter efficiency indicator to detect a gear shift in the next loop. After block 76, the methodology advances to block 62 previously described.

In diamond 66, if the desired torque converter 16 state is not unlocked, the methodology advances to diamond 78 and determines whether the desired torque converter state flag is equal to a predetermined value such as one (1) to indicate that the torque converter 16 has just locked-up. If so, the methodology advances to block 80 and sets the average torque converter efficiency indicator equal to the lower of the average torque converter efficiency indicator and the ratio of the vehicle speed to the engine speed, sets the reference torque converter efficiency indicator equal to the average torque converter efficiency indicator, sets a throttle position at torque converter lock-up equal to the average throttle position and sets the torque converter unlocked state flag to a predetermined value such as zero (0).

If the torque converter unlocked state flag does not equal one (1) in diamond 78 or after block 80, the methodology advances to diamond 82 and determines whether the average torque converter efficiency indicator is less than a predetermined threshold below which implies the computer 42 tried to lock the torque converter 16 in second gear where it is hydraulically impossible to lock. If so, the methodology advances to block 84 and sets the torque converter unlocked period timer equal to a predetermined value such as zero (0) to disable the torque converter diagnostic. If the torque converter efficiency indicator is not less than the predetermined threshold, the methodology advances to diamond 86 and determines whether the torque converter unlocked period timer is less than a predetermined threshold which is the minimum time the torque converter 16 must be unlocked to enable the torque converter diagnostic. Here, the methodology determines whether the torque converter 16 was unlocked momentarily. If so, the methodology advances to block 84 previously described. If not, the methodology advances to diamond 88 and determines whether the throttle position at torque converter lock-up is less than or equal to a minimum throttle position value plus a minimum throttle threshold value below which the torque converter diagnostic will be disabled. Here, the methodology determines presence of a low vehicle load on the engine when torque converter lock-up occurred. If so, the methodology advances to block 84 previously described. If not, the methodology advances to diamond 90 and determines whether improvement in torque converter efficiency (the average torque converter efficiency indicator minus the reference torque converter efficiency indicator) is greater than or equal to the previously calculated minimum expected torque converter efficiency improvement value to pass the diagnostic. If so, the methodology advances to block 92 and sets a torque converter malfunction event counter equal to a predetermined value such as zero (0) which indicates the test passed. The methodology then advances to bubble 84 previously described.

In diamond 90, if improvement in torque converter efficiency is less than the minimum expected improvement in torque converter efficiency, the methodology advances to diamond 94 and determines whether the average torque converter efficiency indicator is less than the reference torque converter efficiency indicator. If so, the methodology advances to block 96 and sets the reference torque converter efficiency indicator equal to the average torque converter efficiency indicator. If not or after block 96, the methodology then advances to block 98 where it increments the torque converter locked period timer to keep track of the time spent in the lock state. The methodology then advances to diamond 100 and determines whether the torque converter locked period timer is less than a maximum monitoring time, after energizing the solenoid-actuated valve 50, during which torque converter efficiency improvement must occur. If so, the methodology advances to bubble 64 previously described. If not, the methodology advances to diamond 102 and determines whether the torque converter malfunction event counter is greater than or equal to a predetermined number of consecutive torque converter malfunction events used to affirm a faulty torque converter 16. If so, the methodology advances to block 104 and announces a torque converter malfunction, for example, by turning a malfunction indicator lamp ON. If not, the methodology advances to block 106 and sets the torque converter malfunction event counter equal to the torque converter malfunction event counter plus a predetermined value such as one (1). The methodology then advances to block 107 and sets the torque converter unlocked period timer equal to a predetermined value such as zero (0). After blocks 104 and 107, the methodology advances to bubble 64 and exits the routine.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of diagnosing a lock-up mechanism for a torque converter in an automatic transmission of an automotive vehicle, said method comprising the steps of:

sensing vehicle speed and engine speed;

calculating a vehicle speed to engine speed ratio based on the sensed vehicle speed and engine speed;

knowing when the torque converter transitions between unlock and lock are initiated;

determining whether the calculated ratio is greater than a predetermined threshold when the torque converter transitions between unlock and lock; and concluding that a failure of the lock-up mechanism has occurred if the calculated ratio is not greater than the predetermined threshold within a predetermined time since transition of the torque converter; and announcing a torque converter malfunction based on the concluded failure of the lock-up mechanism.

2. A method as set forth in claim 1 including the step of either of sensing throttle position and calculating a filtered throttle position value based on the sensed throttle position, and of sensing manifold absolute pressure (MAP) and calculating a filtered MAP value based on the sensed MAP to determine vehicle load on the engine.

3. A method as set forth in claim 2 including the step of determining whether predetermined faults have matured or are maturing.

4. A method as set forth in claim 2 including the step of setting predetermined timers equal to zero (0) if predetermined faults have matured or are maturing.

5. A method as set forth in claim 3 including the step of determining whether a desired torque converter state of the torque converter is unlocked.

6. A method as set forth in claim 5 including the step of incrementing a torque converter unlocked period timer if the desired torque converter state is unlocked.

7. A method as set forth in claim 6 including the step of calculating an expected minimum torque converter efficiency improvement as a function of vehicle speed.

8. A method as set forth in claim 6 including the step of determining whether predetermined conditions have been met and setting a previous loop calculated ratio equal to the current calculated ratio.

9. A method as set forth in claim 5 including the step of determining whether calculated ratio is less than a predetermined threshold.

10. A method as set forth in claim 5 including the step of determining whether a torque converter unlocked period timer is less than a minimum time the torque converter must be unlocked to enable a diagnostic of the lock-up mechanism.

11. A method as set forth in claim 5 including the step of determining whether a throttle position value at torque converter lock-up is less than a predetermined value.

12. A method as set forth in claim 5 including the step of determining whether the calculated ratio minus a reference ratio is greater than or equal to a minimum expected improvement in torque converter efficiency to pass the lock-up mechanism diagnostic.

13. A method as set forth in claim 5 including the step of incrementing a torque converter locked period timer.

14. A method as set forth in claim 13 including the step of determining whether a lock time on the torque converter locked period timer is less than a maximum time during which torque converter efficiency improvement must occur.

15. A method as set forth in claim 14 wherein said step of concluding comprises determining whether a torque converter malfunction event counter is greater than or equal to a predetermined number of consecutive torque converter malfunction events if the lock time is not less than the maximum time during which torque converter efficiency improvement must occur and wherein said step of announcing comprises announcing a torque converter malfunction if the torque converter malfunction event counter is greater than or equal to a predetermined number of consecutive torque converter malfunction events.

16. A method as set forth in claim 15 including the step of incrementing the torque converter malfunction event counter and setting the torque converter unlocked period timer equal to zero (0) if the torque converter malfunction event counter is not greater than or equal to the predetermined number of consecutive torque converter malfunction events.

* * * * *